(12) United States Patent
Bacher et al.

(10) Patent No.: US 6,719,454 B1
(45) Date of Patent: Apr. 13, 2004

(54) DEVICE AND METHOD FOR PREPARING PLASTIC MATERIAL, IN PARTICULAR, THERMOPLASTIC MATERIAL

(76) Inventors: Helmut Bacher, Bruck/Hausleiten 17, St. Florian (AT), A-4490; Helmuth Schulz, Badstrasse 20, St. Florian (AT), A-4490; Georg Wendelin, Waldbothenweg 84, Linz (AT), A-4033

( * ) Notice: Subject to any disclaimer, the term of this patent is extended or adjusted under 35 U.S.C. 154(b) by 0 days.

(21) Appl. No.: 10/009,454
(22) PCT Filed: May 24, 2000
(86) PCT No.: PCT/AT00/00146
§ 371 (c)(1),
(2), (4) Date: Nov. 5, 2001
(87) PCT Pub. No.: WO00/74912
PCT Pub. Date: Dec. 14, 2000

(30) Foreign Application Priority Data

Jun. 2, 1999 (AT) ................................................ 992/99

(51) Int. Cl.⁷ .............................. B01F 9/18; B02C 18/12
(52) U.S. Cl. ...................... 366/314; 366/315; 366/186; 241/178.1; 241/186.5; 425/202
(58) Field of Search ................................. 366/314, 317, 366/315, 186; 241/296, 278.1, 244, 191, 186.5, 185.5; 425/202

(56) References Cited

U.S. PATENT DOCUMENTS 2,971,748 A * 2/1961 Ellegast ....................... 366/317
3,998,433 A * 12/1976 Iwako ...................... 366/178.3

(List continued on next page.)

FOREIGN PATENT DOCUMENTS

DE 1 679 834 * 5/1971
DE 30 03 938 A 8/1981

(List continued on next page.)

OTHER PUBLICATIONS

Patent Abstracts of Japan, vol. 1996, No. 04,Apr. 30, 1996 & JP 07 313893 A (Kusatsu Denki KK), Dec. 5, 1995.

*Primary Examiner*—Tony G. Soohoo
(74) *Attorney, Agent, or Firm*—Townsend and Townsend and Crew LLP

(57) ABSTRACT

A device for preparing plastic material, in particular, thermoplastic material, comprises a receptacle (1) for the material, in which rotating tools (21) are provided to act onto the material which are supported by a support disc (9) and rotate about a vertical axis (8) of the receptacle (1). Driving of the support disc (9) is effected by a shaft (4) which passes through the bottom (3) of the receptacle (1) and is driven by a motor (5). The material is discharged from the receptacle (1) through a discharge opening (15) to which the housing (16) of a screw (17) is attached. The discharge opening (15) is provided within the same receptacle (1) and is situated below the path of rotation of the tools (21) and below the support disc (9). Additional moving tools (12) are provided within the same receptacle (1) below the support disc (9) which convey the material into the discharge opening (15). In this way a long dwelling time of the treated plastic material within the receptacle (1) is achieved so that constructive length and driving energy for the screw (17) are economized.

A method for preparing such plastic material provides that the material is continuously treated within the same receptacle in two successive steps by meows of two sets of tools arranged one above the other. In the first step carried out by the upper set of tools, the material is pre-comminuted and/or pre-heated and/or pre-dried and/or pre-mixed. In the second step carried out by the lower set of tools, the same treatment is effected, but less intensively as compared with the first step. The material thus treated is supplied by the tools of the second step to a screw which discharges the material from the receptacle.

14 Claims, 1 Drawing Sheet

U.S. PATENT DOCUMENTS

| | | | | |
|---|---|---|---|---|
| 4,175,873 A | * | 11/1979 | Iwako et al. | 366/165.3 |
| 4,222,728 A | | 9/1980 | Bacher et al. | |
| 4,460,277 A | * | 7/1984 | Schulz et al. | 366/186 |
| 4,463,907 A | * | 8/1984 | Biersack | 241/278.1 |
| 4,691,867 A | * | 9/1987 | Iwako et al. | 366/317 |
| 4,894,001 A | * | 1/1990 | Petschner | 366/186 |
| 4,983,046 A | * | 1/1991 | Murata et al. | 366/317 |
| 5,102,326 A | * | 4/1992 | Bacher et al. | 425/202 |
| 5,536,154 A | * | 7/1996 | Bacher et al. | 241/101.2 |
| 5,599,102 A | * | 2/1997 | Hamada et al. | 366/178.1 |
| 5,783,225 A | * | 7/1998 | Bacher et al. | 425/202 |
| 6,019,498 A | * | 2/2000 | Hamada et al. | 366/178.1 |

FOREIGN PATENT DOCUMENTS

| | | | |
|---|---|---|---|
| DE | 43 33 849 | | 3/1995 |
| EP | 0 496 080 | | 7/1992 |
| GB | 1190395 | * | 5/1970 |
| WO | WO 95 34418 A | | 12/1995 |

* cited by examiner

DEVICE AND METHOD FOR PREPARING PLASTIC MATERIAL, IN PARTICULAR, THERMOPLASTIC MATERIAL

BACKGROUND OF THE INVENTION

The invention relates to a device for preparing plastic material, in particular, thermoplastic material, which comprises a receptacle for the material to be treated, in which tools are provided to act onto the material which rotate about a vertical axis and are driven by a shaft passing through the bottom of the receptacle, the tools being supported by a support disc, and further comprising, for discharging the material from the receptacle, a screw, the housing of which communicates with a discharge opening of the receptacle, the discharge opening being below the path of rotation of the tools and lower than the support disc, and additional moving tools being provided below the support disc within the receptacle for conveying the material into the discharge opening. Furthermore, the invention relates to a method for preparing such plastic material.

Devices of this kind and similar ones are known, e.g. from AT 396,900 B or AT E 128,898 T. In the first-mentioned known construction, preponed to the receptacle which communicates with the screw housing is a further receptacle wherein further tools are provided which act onto the material introduced. Both receptacles are interconnected by a short piece of pipe which can be shut by a valve so that the receptacle communicating with the screw housing may be set under vacuum.

In the second-mentioned known construction, the receptacle is subdivided into two chambers lying one above the other which communicate with each other by one channel only. A further screw is arranged within this channel and conveys the material, after being treated by the tools provided in the upper chamber, down into the lower chamber from which the material is discharged by the first-mentioned screw.

The disadvantage of great constructive expenditure is characteristic for both known devices. In the case of the first-mentioned construction, there is, moreover, the drawback that a relative high percentage of plastic particles, passing the device, will reach the second receptacle on the shortest way, without any pre-treatment, i.e. without comminution, pre-heating, drying, pre-compacting and so on, and will pass from there again on the shortest way to the plastifying screw. This proportion of plastic material, being either not treated or poorly treated, will form inhomogeneous nests of plastic material in the screw and is detrimental to the quality of the plastified material. Therefore, if one wants to obtain a final product, be it granulated material or be it an object extruded into a mold, in a desired uniform quality, the screw, that discharges the poorly prepared material from the receptacle, has to bring the whole material conveyed by it up to the desired quality and temperature at the screw's outlet in order to be able to extrude the material with the desired homogeneity. This outlet temperature has to be maintained relative high in order to ensure that all plastic particles are sufficiently plastified. This, in turn, involves an increased expenditure of energy and, moreover, the risk that thermal damages of the plastic material (reduction of the length of molecular chains) is to be feared due to the relative high outlet temperature. Furthermore, both known construction have the disadvantage not to allow a continuous operation. Moreover, the second-mentioned construction has the drawback that the plastic material in its plastified state is subjected to oxidizing reactions.

SUMMARY OF THE INVENTION

It is an object of the invention to improve a device of the type described at the outset so that as to avoid that freshly introduced material reaches the discharging screw without being sufficiently treated, on the one hand, and to simplify substantially both the device and its operation on the other hand. As a consequence, it is striven for reducing the expenditure of energy necessary for obtaining a homogeneous, good quality of the material conveyed by the screw. The invention solves this problem in that the upper inner space portion of the receptacle, which exists above the support disc, communicates with a lower inner space portion of the receptacle, being below the support disc in the same receptacle, via a free annular gap between the outer circumference of the support disc and the lateral wall of the receptacle, in which lower portion the additional moving tools and the discharge opening are located, a proportion of the material in the upper inner space portion reaching the lower inner space portion through the annular gap. Thus, the intake opening of the discharge screw formed by the discharge opening is neither at the level of the tools supported by the support disc nor a short distance above it, but below. Through the necessary free gap between the circumference of the support disc and the inner wall of the receptacle, part of the plastic material, that is caused to move around by the stop effect of the tools supported by the support disc and revolving in the upper inner space, reaches the region below the support disc, thus the lower portion of the inner space, where this material is treated again by the additional tools existing there and is finally introduced into the discharge opening of the receptacle and, thus, into the screw housing. Thus, the zone, where predominantly comminution and drying or pre-heating of the material is effected, is separated from that zone where the material is pressed into the screw housing. In this manner, an equilibrium will adapt itself after a short period of operation between the volume of material discharged by the screw below the support disc and the flow of material which enters the space below the support disc through the annular gap. The consequence is that the space below the support disc, that is substantially filled with material to be discharged by the screw and revolves in form of a mixing spout, provides a certain resistance to discharging the material so that only an insignificant proportion of the material freshly introduced into the receptacle, if at all, may immediately pass down into the region below the rotating support disc. This contributes to ensure a sufficient dwelling time of the material within the receptacle, particularly in the region above the support disc. In this way, the temperature of the material introduced into the discharge opening of the receptacle is homogenized, because substantially all plastic particles in the receptacle are sufficiently pre-treated. The approximately constant temperature of the material entering the screw housing has as a consequence that inhomogeneous plastic nests within the housing of the extruder screw are eliminated to a wide extent, thus enabling to make the screw's length shorter than in known constructions, because the screw needs to work less to bring the plastic material surely up to a uniform plastifying temperature. The constant entering temperature of the plastic material into the screw housing causes, furthermore, a uniform pre-compaction of the material within the screw housing which is favorable for the conditions at the extruder opening, particularly as to a uniform throughput through the extruder and a uniform quality of material at the outlet of the extruder. The shortened screw length results in energy savings and in a reduced treatment temperature in the extruder, as compared with known constructions, because the average temperature at which the material enters the screw housing is more uniform than in the known constructions. Thus, the treated plastic material, when seen over the whole treatment procedure, has to be brought up to a less elevated temperature according to the subject of the invention in comparison with known constructions in order to be sure to achieve a sufficient plastification. This reduction of the top temperatures has as a consequence the above-mentioned savings of energy and, moreover, avoids thermally damaging the material to be treated.

As may be seen, the device according to the invention may be operated either continuously or in batches, thus being more universal in application than the second-mentioned known construction, and, in addition, has the advantage of a reduced constructive expenditure as compared with the two known constructions described at the outset, alone by the possibility of shortening the screw length. Furthermore, the device according to the invention may be operated either under vacuum or at a normal pressure. Although the device according to the invention is especially suited for preparing thermoplastic material, preparing other types of plastic material is also possible, particularly if they are present as a filler in the mass to be treated.

According to a preferred embodiment of the invention, the additional moving tools are mounted on a rotor that is connected to the shaft in a manner for common rotation. This leads to the possibility of arranging a plurality of additional tools in such a way as not to interfere with each other. A favorable embodiment consists in that the additional moving tools are formed by impact tools pivotally mounted on the rotor about vertical axes in the region of the periphery of the rotor. This results in a favorable treatment of the material within the region of the rotor's periphery and eventually a good action in view of introducing the treated material into the discharge opening of the receptacle. The same advantages are achieved according to an embodiment of the invention in which the additional moving tools are formed by shovels or knives mounted on the rotor and, optionally, have surfaces or edges, particularly cutting edges, which are bent or angled outwardly in opposite direction to that of the rotation. By shovels or knives shaped in this way, the plastic material is pressed into the screw housing as is comparable with the action of a spatula. Similar advantages will result according to a further modification in which the tools are formed by bars mounted either on the shaft or on the rotor. The same applies for a further modification in which two support discs are mounted on the shaft one above the other, the lower one of which carrying the additional moving tools. These additional tools may, in this case, be formed in the same way as those on the upper support disc or may be different.

In all modifications described, it is favorable to arrange the path of revolution of the additional moving tools at least partly at the level of the discharge opening of the receptacle, because in this way the pressing action of the additional moving tools onto the material to be introduced into the intake opening of the screw housing and the above-mentioned spatula effect is utilized at its best.

An especially favorable construction consists according to the invention in that the rotor is formed by a block coaxial to the shaft whose superficies is closer to the axis of the shaft than the circumference of the support disc so that an annular space is formed below the support disc which communicates freely with the annular gap and in which the additional moving tools will rotate. This results in an uptake volume below the support disc which suffices for the treated material and contributes to ensuring a long and uniform dwelling period of the treated plastic particles within the receptacle. In order to achieve the most intense treatment possible of the material also within the space below the support disc, it is convenient to provide, according to the invention, a plurality of sets of additional moving tools one above the other and distributed in peripheral direction of the rotor.

In tests, it has been found that particularly favorable conditions are achieved, if the width of the free annular gap, when measured in radial direction of the shaft, amounts to 20 to 150 mm. In a surprising manner, one experienced that this interval is independent of the receptacle's diameter. The size of the gap chosen in the above range is only dependent on the type of plastic material to be treated. For example, a different gap width is better for foils than for a compact plastic material (injection molded parts and so on). A preferred width of the annular gap is 20 to 100 mm.

The subject matter of the invention is also advantageous in that it is flexible regarding the connection of the screw housing to the receptacle. However, it is favorable to connect the housing of the screw tangentially to the receptacle so that the discharge opening of the receptacle, which is at the same time the intake opening of the screw housing, lies on the superficies of the housing. This has the advantage that the extruder head or other outlet component of the screw housing may be arranged on one front end of the screw housing, while driving of the screw is effected from the other front end of the screw. This avoids deviations of the flow of material which would be unavoidable if the outlet openings were at the superficies of the screw housing.

The method according to the invention for preparing plastic material, in particular, thermoplastic material, by means of tools rotating about a vertical axis in a receptacle, the material being discharged from the receptacle by a screw, is characterized in that the material is continuously treated in two successive steps in the same receptacle by means of two sets of tools arranged one above the other, the material being pre-comminuted and/or pre-heated and/or pre-dried and/or pre-mixed in the first step carried out by the upper set of tools, whereas in the second step carried out by the lower set of tools the same treatment of the material is effected, but less intensively than in the first step, the material being supplied to the screw by the tools of the second step. With a considerably lower expenditure of energy, as compared with conventional methods, a homogeneous and uniform quality of the material supplied by the screw is achieved in this way.

BRIEF DESCRIPTION OF THE DRAWINGS

In the drawings, an embodiment of the subject matter of the invention is schematically illustrated.

FIG. 1 is a vertical cross-section through the device, while

DETAILED DESCRIPTION OF THE INVENTION

Figure 1:
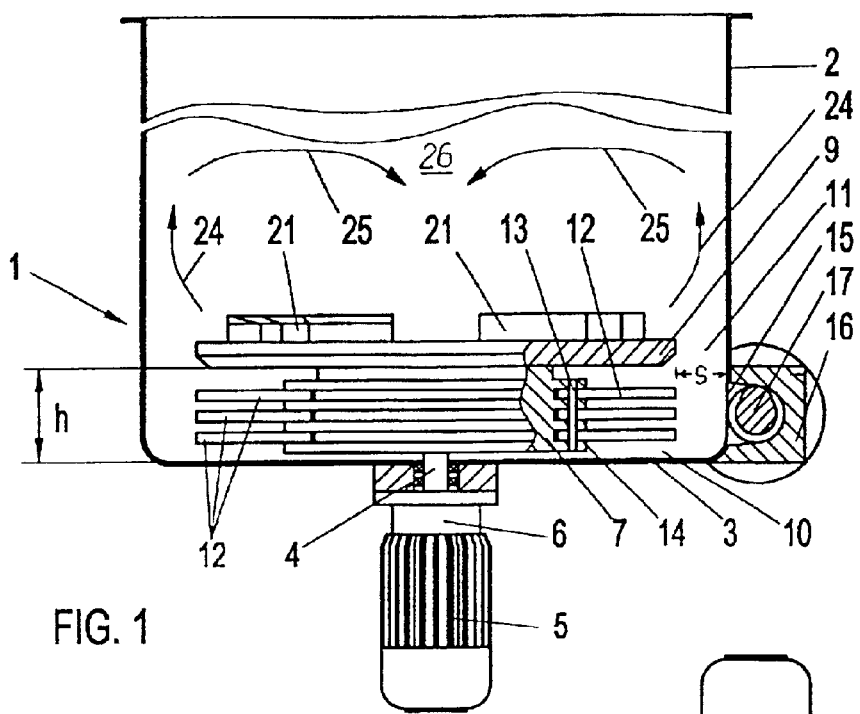
Figure 2:
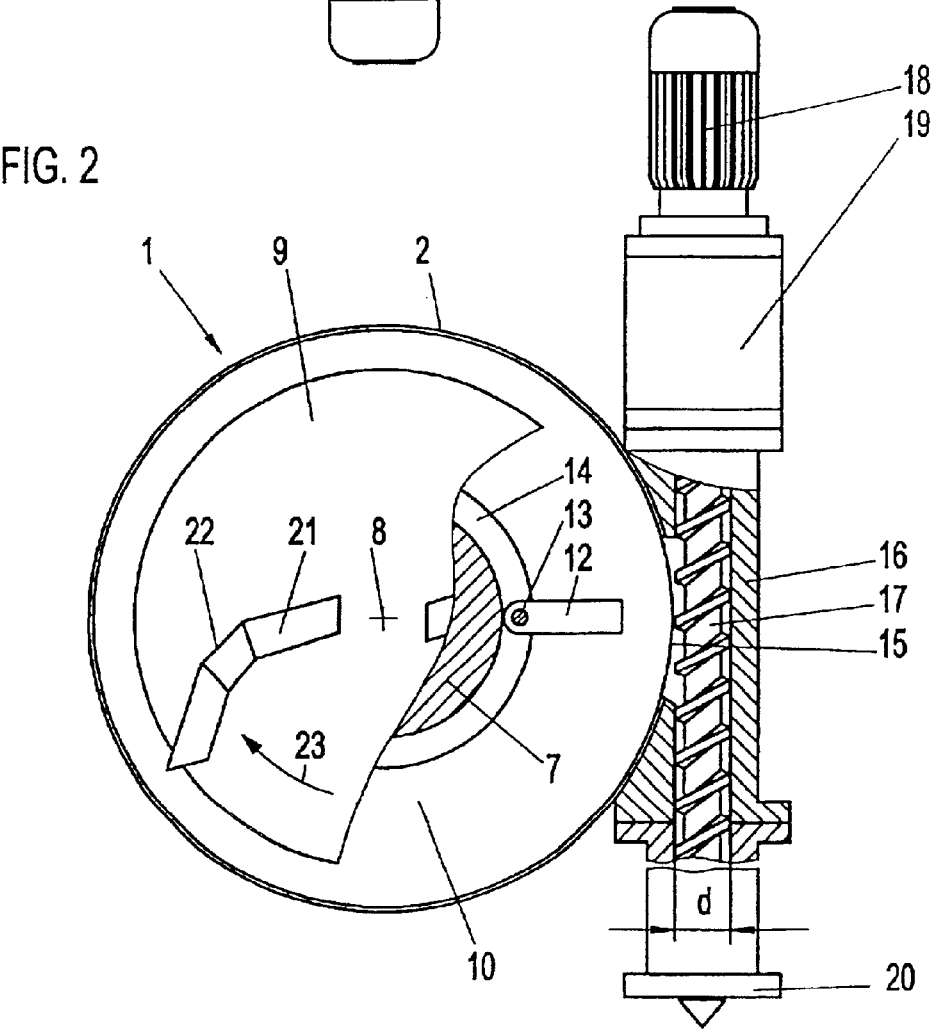
FIG. 2 is a plan view onto the same, partially in cross-section.

The device according to FIGS. 1 and 2 comprises a receptacle 1 for the plastic material, in particular, thermoplastic material, to be processed that is introduced into this receptacle from above by means of a conveying device, e.g. by a conveying belt, not shown. The receptacle 1 has the shape of a pot with vertically extending lateral walls 2, a flat bottom 3 and is of circular cross-section. A shaft 4 passes through the bottom 3 and extends concentrically to the central vertical axis 8 of the receptacle 1. The shaft 4 is supported while being sealed against the bottom 3 and is driven for rotational motion by a motor 5 including a gear mechanism 6 which are located below the bottom 3. Within the receptacle 1, a rotor 7 and a support disc 9, which is situated above the latter, are connected to the shaft 4 for common rotation. The rotor 7 is formed by a circular cylindrical block whose axial extension is substantially larger than that of the flat support disc 9, while its radial dimension is substantially smaller than that of the support disc 9. In this way, a free inner space portion 10 is formed below the support disc 9 which has a free communication of flow of the processed material with the inner space portion 26 of the receptacle 1, which is situated above the support disc 9, via an annular gap 11 existing between the outer circumference of the support disc 9 and the lateral wall 2 of the receptacle 1. Thus, the processed plastic material may unimpededly pass from the space 26 above the support disc 9, through this free annular gap 11 to reach the annular inner space portion 10 situated below. Within the annular space, tools 12 are arranged which rotate in this annular space about the axis 8 and, to this end, are fastened to the rotor 7. This fastening is effected by vertical bolts 13 which hold in a pivotal manner the inner ends of the tools 12 which engage annular grooves 14 of the rotor 7 so that the tools 12 may freely swing about the axes of the bolts 13. The free ends of the tools 12 are spaced from the lateral wall 2 of the receptacle 1. In this way, the tolls 12 form impact tools which act additionally onto the plastic material present in the inner space portion 10 to mix it and/or to comminute it and/or to heat it up. By the centrifugal force exerted onto the plastic material by these tools 12, the plastic material is pressed into a discharge opening 15 of the receptacle 1 which opening 15 is situated at the level of the tools 12 and connects the lower inner space portion 10 of the receptacle 1 to the interior of a cylindrical housing 16 in which a screw 17 is rotatably supported. This screw is driven for rotation about its axis on one of its front ends by a motor 18 including a gear mechanism 19 and conveys the prepared plastic material, fed to it through the discharge opening 15, towards its other front end where the finished plastic material exits. The assigned end of the housing 16 forms, for example, a connection flange 20, to which e.g. a mold may be attached that gives the desired shape to the plastic material. As may be seen, the screw housing 16 is approximately tangentially connected to the receptacle 1 so that the discharge opening 15 and the assigned opening of the housing 16 is on its lateral wall. This enables the above-mentioned arrangement of motor 18 and connection flange 20 on both respective front ends of the screw 17 or of the housing 16 so that deviations of the plastified plastic material in the region of its exit from the housing 16 are avoided.

The support disc 9 supports also tools 21 which, however, are firmly secured to the support disc 9. These tools 21 mix and/or comminute and/or heat the material being in the upper inner space portion 26 of the receptacle 1. For efficient comminution, it is convenient to form the tools 21 with cutting edges 22. If a draw cut is desired, it is suitable to form the cutting edges 22 either curved or, as represented in FIG. 2, in an angled fashion, namely with respect to the radial direction of the support disc 9 offset opposite to the direction of rotation of the support disc 9 (arrow 23).

In operation, when the support disc 9 rotates, the plastic mass introduced into the receptacle 1 will also rotate under the influence of the tools 21, the plastic material rising along the lateral wall 2 of the receptacle 1 within the upper inner space portion 26 (arrows 24), and falls down again in the region of the axis of the receptacle 1 (arrows 25). The, thus, resulting mixing spout whirls the material introduced through so that a good mixing effect is achieved. A small proportion of the material, that had been introduced into the receptacle 1 and has already been comminuted, however, passes through the annular gap 11 into the lower inner space portion 10 below the support disc 9 and is treated there by the tools 12. After a short starting period, a balance will adjust itself between the material discharged by the screw 17 through the discharge opening 15 and, thus, out of the annular space 10, and the material supplied through the annular gap 11 from above into the annular space 10. This has as a consequence that it is quite unlikely or even impossible that a plastic particle, once being introduced into the receptacle 1, may reach the screw housing 16 without having passed a sufficient dwelling time in the receptacle 1 and without being sufficiently processed by the tools 12 and 21. Thus, the quantity of plastic material passing the discharge opening 15 and being discharged by the screw 17 will approximately have a uniform nature, particularly regarding temperature and size of plastic particles. Therefore, the screw 17 has to take less energy into the plastic mass in order to bring the plastic mass to the desired plastified state, which has as a consequence that high thermal peak loads of the plastic material within the screw housing 16 are avoided. In this way, the plastic material is saved, and energy for driving the screw 17 is substantially economized.

The tools 12 need not necessarily to be formed by components pivotal on the rotor 7. For example, it is possible to have the tools 12 in the shape of shovels and, optionally, to secure those shovels or also tools 12 rigidly on the rotor 7 in the manner shown in FIG. 2. Likewise, a design of the tools 12 may be used, as is illustrated in FIG. 2 for the tools 21. A further modification consists in that the tools which rotate within the space 10 and are formed by bars which are either secured to the shaft 4 or to the rotor 7, and may extend in radial direction from the shaft 4, but not necessarily. A further modification consists in that a further support disc is mounted on the shaft 4 below the support disc 9 instead of the rotor 7 and supports the additional tools 12. In this case, it is possible to form these tools in the same manner as the tools supported by the upper support disc 9.

As may be seen from FIG. 1, a plurality of sets of tools 12 are arranged one above the other on the rotor 7. The tools need not be formed equally, for example individual tools 12 may be rigidly secured to the rotor 7, while other tools are swinging. In a likewise manner, shape and size or arrangement of the tools 12 may be different in individual sets, optionally also within a single set.

The shape and size of the annular space 10 are dependent on the application intended. The distance h between the lower side of the support disc 9 and the bottom 3 of the receptacle 1 depends on the height of the rotor 7 and also upon the size and position of the discharge opening 15. Favorable conditions will result, if the height h of the annular space 10 is at least equal, preferably substantially larger, than the diameter d of the screw 17 or the inner diameter of the screw housing 16. In the embodiment shown in FIG. 1, the ratio h:d=1.56, and the arrangement is suitably such that the portion of the annular space 10, which is covered by the support disc 9 and lies outside the rotor 7, has approximately a square cross-section. Other cross-section shapes of this annular space are possible, particularly if different tools rotate in this annular space 10, e.g. a rotor 7 which is formed as a shovel wheel. The connection of the screw housing 16 to the receptacle 1 is not necessarily tangential. If desired, it is also possible to connect one front end of the screw housing 16 in radial direction or excentrically to the receptacle 1 in which case filling of the screw 17 is effected from the front side of it.

As may be seen, the size of the annular gap 11 has an influence on the mode of operation described. This annular gap should not be too large in order to prevent larger particles of material from passing through this annular gap 11. On the other hand, the annular gap 11 should neither be too small, because in this case too small a quantity of material reaches the lower side of the support disc 9 and the lower inner space portion 10, thus running the risk that the screw 17 is insufficiently filled. In order to be able to adapt the device to different materials to be processed, the size of the annular gap 11 may be variable, e.g. by some components which are supported by the support disc 9 and are adjustable relative to it so that the gap 11 may be partially covered or may be freed by them to obtain a larger width. Such components may optionally be also provided on the wall 2 of the receptacle 1. Tests have shown that favorable values of the width s (FIG. 1) of the annular gap 11, when measured in radial direction, will result within a range of 20 to 150 mm, preferably 20 to 100 mm, independently from the diameter of the receptacle 1, but in dependence on the type of material to be processed.

It is suitable to form the tools 12 in the lower inner space portion 10 of the receptacle 1 in such a way that they treat the plastic material being in the lower inner space portion 10 less intensive than the tools 21 which are supported by the support disc 9 and rotate in the upper inner space portion 26 of the receptacle 1.

What is claimed is:

1. Device for preparing plastic material, in particular, thermoplastic material, which comprises a receptacle (1) for the material to be treated, in which tools (21) are provided to act onto the material which rotate about a vertical axis (8) and are driven by a shaft (4) passing through the bottom (3) of the receptacle (1), the tools being supported by a support disc (9), and further comprising, for discharging the material from the receptacle (1), a screw (17), the housing (16) of which communicates with a discharge opening (15) of the receptacle (1), the discharge opening (15) being below the path of rotation of the tools (21) and lower than the support disc (9), and additional moving tools (12) being provided below the support disc (9) within the receptacle (1) for conveying the material into the discharge opening (15), characterized in that the upper inner space portion (26) of the receptacle (1), which exists above the support disc (9), communicates with a lower inner space portion (10) of the receptacle (1), being below the support disc (9) in the same receptacle (1), via a free annular gap (11) between the outer circumference of the support disc (9) and the lateral wall (2) of the receptacle (1), in which lower portion the additional moving tools (12) and the discharge opening (15) are located, a proportion of the material in the upper inner space portion (26) reaching the lower inner space portion (10) through the annular gap (11).

2. Device according to claim 1, characterized in that the additional moving tools (12) are mounted on a rotor (7), preferably on its periphery, that is connected to the shaft (4) in a manner for common rotation.

3. Device according to claim 2, characterized in that the rotor (7) is formed by a block coaxial to the shaft (4) whose superficies is closer to the axis (8) of the shaft (4) than the circumference of the support disc (9) so that an annular space (10) is formed below the support disc (9) which communicates freely with the annular gap (11) and in which the additional moving tools (12) will rotate.

4. Device according to claim 2, characterized in that the additional moving tools (12) arm formed by impact tools mounted pivotally about vertical axes on the rotor (7) in the region of the periphery of the rotor (7).

5. Device according to claim 4, characterized in that the additional moving tools (12) are pivotal about vertical bolts (13) which engage annular grooves (14) of the periphery of the rotor (7).

6. Device according to claim 2, characterized in that the additional moving tools (12) are formed by shovels or knives mounted on the rotor (7).

7. Device according to claim 2, characterized in that the shovels or knives have surface or edges which are bent or angled outwardly in opposite direction to that of the rotation.

8. Device according to claim 2, characterized in that the surfaces or edges are cutting edges (22).

9. Device according to claim 1, characterized in that the additional moving tools (12) are formed by bars mounted either on the shaft (4) or on the rotor (7).

10. Device according to claim 1, characterized in that two support discs are mounted on the shaft (4) one above the other, the lower one of which carrying the additional moving tools (12).

11. Device according to claim 1, characterized in that the path of revolution of the additional moving tools (12) is at least partly at the level of the discharge opening (15) of the receptacle (1).

12. Device according to claim 1, characterized in that a plurality of sets of additional moving tools (12) are provided one above the other and distributed in peripheral direction of the receptacle (1).

13. Device according to claim 1, characterized in that the width of the free annular gap (11), when measured in radial direction of the shaft (4), amounts to 20 to 150 mm, preferably 20 to 100 mm.

14. Device according to claim 1, characterized in that the housing (16) of the screw (17) is connected tangentially to the receptacle (1) so that the discharge opening (15) lies on the superficies of the housing (16).

* * * * *